US012657512B2

(12) United States Patent
Karpovsky et al.

(10) Patent No.: US 12,657,512 B2
(45) Date of Patent: Jun. 16, 2026

(54) MACHINE LEARNING TRAINING DURATION CONTROL

(71) Applicant: Microsoft Technology Licensing, LLC, Redmond, WA (US)

(72) Inventors: Andrey Karpovsky, Kiryat Motzkin (IL); Eitan Shteinberg, Haifa (IL); Tamer Salman, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 838 days.

(21) Appl. No.: 17/983,448

(22) Filed: Nov. 9, 2022

(65) Prior Publication Data

US 2024/0152798 A1 May 9, 2024

(51) Int. Cl.
*G06N 3/08* (2023.01)
*G06N 20/00* (2019.01)

(52) U.S. Cl.
CPC .............. *G06N 20/00* (2019.01); *G06N 3/08* (2013.01)

(58) Field of Classification Search
CPC .................................. G06N 20/00; G06N 3/08
See application file for complete search history.

(56) References Cited

U.S. PATENT DOCUMENTS

| | | | | |
|---|---|---|---|---|
| 8,755,737 | B1 * | 6/2014 | Galen | ...................... G09B 7/08 434/323 |
| 9,588,877 | B1 | 3/2017 | Adir et al. | |
| 9,612,941 | B1 | 4/2017 | Bitar et al. | |
| 10,223,527 | B2 | 3/2019 | Farchi et al. | |
| 10,931,689 | B2 * | 2/2021 | El-Moussa | .......... H04L 63/1416 |
| 11,106,789 | B2 | 8/2021 | Kraus et al. | |
| 11,315,031 | B2 * | 4/2022 | Strachan | ........ G06Q 10/063114 |
| 11,429,895 | B2 * | 8/2022 | Yakovlev | ................. G06N 5/01 |
| 11,461,646 | B2 * | 10/2022 | Zare | ......................... G06N 3/08 |
| 11,477,216 | B2 | 10/2022 | Karpovsky et al. | |

(Continued)

FOREIGN PATENT DOCUMENTS

CN          114692693 A          7/2022

OTHER PUBLICATIONS

"Fractal dimension", retrieved from << https://en.wikipedia.org/wiki/Fractal_dimension >>, Sep. 26, 2022, 10 pages.

(Continued)

*Primary Examiner* — Beau D Spratt

(57) ABSTRACT

Some embodiments select a machine learning model training duration based at least in part on a fractal dimension calculated for a training data dataset. Model training durations are based on one or more characteristics of the data, such as a fractal dimension, a data distribution, or a spike count. Default long training durations are sometimes replaced by shorter durations without any loss of model accuracy. For instance, the time-to-detect for a model-based intrusion detection system is shortened by days in some circumstances. Model training is performed per a profile which specifies particular resources or particular entities, or both. Realistic test data is generated on demand. Test data generation allows the trained model to be exercised for demonstrations, or for scheduled confirmations of effective monitoring by a model-based security tool, without thereby altering the model's training.

20 Claims, 6 Drawing Sheets

800

START

OBTAIN 802 TRAINING DATA HAVING A DATASET DURATION

CALCULATE 804 A TRAINING DATA FRACTAL DIMENSION

SELECT 806 A MODEL TRAINING DURATION PER THE FRACTAL DIMENSION

TRAIN 808 A MODEL FOR AT LEAST THE SELECTED DURATION

EMPLOY 810 THE TRAINED MODEL

FINISH

(56)                    References Cited

U.S. PATENT DOCUMENTS

| | | | |
|---|---|---|---|
| 11,481,478 | B2 | 10/2022 | Levin et al. |
| 2013/0124576 | A1 | 5/2013 | Adir et al. |
| 2013/0196305 | A1 | 8/2013 | Adir et al. |
| 2014/0214396 | A1 | 7/2014 | Adir et al. |
| 2014/0237450 | A1 | 8/2014 | Levy et al. |
| 2015/0046138 | A1 | 2/2015 | Adir et al. |
| 2016/0246705 | A1 | 8/2016 | Bitar et al. |
| 2017/0103099 | A1 | 4/2017 | Bitar et al. |
| 2017/0109515 | A1 | 4/2017 | Aharoni et al. |
| 2017/0124324 | A1 | 5/2017 | Peleg et al. |
| 2017/0193375 | A1 | 7/2017 | Bitar et al. |
| 2018/0137303 | A1 | 5/2018 | Farkash et al. |
| 2018/0158061 | A1 | 6/2018 | Edelstein et al. |
| 2018/0232518 | A1 | 8/2018 | Copty et al. |
| 2018/0232520 | A1 | 8/2018 | Frandzel et al. |
| 2018/0232523 | A1 | 8/2018 | Copty et al. |
| 2019/0171816 | A1 | 6/2019 | Copty et al. |
| 2019/0180029 | A1 | 6/2019 | Copty et al. |
| 2020/0042694 | A1 | 2/2020 | Karpovsky et al. |
| 2020/0177638 | A1 | 6/2020 | Salman et al. |
| 2020/0184380 | A1* | 6/2020 | Thomas ................. G06N 3/063 |
| 2020/0285737 | A1 | 9/2020 | Kraus et al. |
| 2020/0296117 | A1 | 9/2020 | Karpovsky et al. |
| 2020/0310889 | A1 | 10/2020 | Levin et al. |
| 2020/0311231 | A1 | 10/2020 | Levin et al. |
| 2020/0320845 | A1 | 10/2020 | Livny et al. |
| 2020/0336566 | A1 | 10/2020 | Yassin et al. |
| 2020/0372342 | A1* | 11/2020 | Nair .................... G06F 16/2246 |
| 2020/0380160 | A1 | 12/2020 | Kraus et al. |
| 2021/0081712 | A1* | 3/2021 | Saunders ............... G06V 10/24 |
| 2021/0120043 | A1 | 4/2021 | Karpovsky et al. |
| 2021/0303684 | A1 | 9/2021 | Makhlevich et al. |
| 2021/0344691 | A1 | 11/2021 | Karpovsky et al. |
| 2021/0397565 | A1 | 12/2021 | Kraus et al. |
| 2021/0406724 | A1* | 12/2021 | Zoldi ................. G06Q 20/4016 |
| 2021/0409419 | A1 | 12/2021 | Kraus et al. |
| 2022/0030019 | A1 | 1/2022 | Neuvirth et al. |
| 2022/0086179 | A1 | 3/2022 | Levin et al. |
| 2022/0086180 | A1 | 3/2022 | Karpovsky et al. |
| 2022/0131900 | A1 | 4/2022 | Karin et al. |
| 2022/0191173 | A1 | 6/2022 | Karpovsky et al. |
| 2023/0366825 | A1* | 11/2023 | Lancuba ................. G01J 3/443 |

OTHER PUBLICATIONS

"Hurst exponent", retrieved from << https://en.wikipedia.org/wiki/Hurst_exponent >>, Jun. 12, 2022, 8 pages.

"Autocorrelation", retrieved from << https://en.wikipedia.org/wiki/Autocorrelation >>, Aug. 29, 2022, 9 pages.

"Poisson distribution", retrieved from << https://en.wikipedia.org/wiki/Poisson_distribution >>, Sep. 28, 2022, 24 bages.

J. Theiler, "Estimating the Fractal Dimension of Chaotic Time Series", retrieved from << https://citeseerx.ist.psu.edu/viewdoc/download?doi=10.1.1.229.3288&rep=rep1&type=pdf >>, No. later than Dec. 31, 1990, 24 pages.

M.C. Breslin and J.A. Belward, "Fractal Dimensipons for Rainfall Time Series", retrieved from << https://www.mssanz.brg.au/

MODSIM97/Vol%201/Breslin.pdf >>, No. later than Oct. 3, 2022, 6 pages.

Tilmann Gneiting, et al., "Estimators of Fractal Dimension: Assessing the Roughness of Time Series and Spatial Data", retrieved from << https://arxiv.org/pdf/1101.1444.pdf >>, Jul. 25, 2012, 31 pages.

F Cervantes-De la Torre et al., "Fractal dimension algorithms and their application to time series associated with natural phenomena", retrieved from << https://iopscience.iop.org/article/10.1088/1742-6596/475/1/012002/pdf >>, o later than Dec. 31, 2013, 11 pages.

Jason Brownlee, "How Much Training Data is Required for Machine Learning?", retrieved from << https://machinelearningmastery.com/much-training-data-required-machine-learning/ >>, Jul. 24, 2017, 27 pages.

"What do you mean by Noise in given Dataset and How can you remove Noise in Dataset?", retrieved from << https://www.i2tutorials.com/what-do-you-mean-by-noise-in-given-dataset-and-how-can-you-remove-noise-in-dataset/ >>, Sep. 26, 2019, 6 pages.

Eugene Dorfman, "How Much Data Is Required for Machine Learning?", retrieved from << https://postindustria.com/how-much-fdata-is-required-for-machine-learning/ >>, Mar. 25, 2022, 14 pages.

"How Much Training Data is Needed for Machine Learning?", retrieved from << https://ai-forum.com/opinion/how-much-training-data-is-needed-for-machine-learning/ >>, Aug. 10, 2021, 7 pages.

"List of fractals by Hausdorff dimension", retrieved from << https://en.wikipedia.org/wiki/List_of_fractals_by_Hausdorff_dimension >>, Sep. 5, 2022, 15 pages.

Ihssan Tinawi, "Machine Learning for Time Series Anomaly Detection", retrieved from << https://dspace.mit.edu/bitstream/handle/1721.1/123129/1128282917-MIT.pdf?sequence=1&isAllowed=y >>, no later than Jun. 30, 2019, 55 pages.

"List of probability distributions", retrieved from << https://en.wikipedia.org/wiki/List_of_probability_distributions >>, Sep. 9, 2022, 10 pages.

"Heartbeat (computing)", retrieved from << https://en.wikipedia.org/wiki/Heartbeat_(computing) >>, Jun. 2, 2022, 4 pages.

"Machine learning", retrieved from << https://en.wikipedia.org/wiki/Machine_learning >>, Oct. 6, 2022, 30 pages.

"Time series", retrieved from << https://en.wikipedia.org/wiki/Time_series >>, Sep. 23, 2022, 14 pages.

"Fractal analysis", retrieved from << https://en.wikipedia.org/wiki/Fractal_analysis >>, Sep. 26, 2022, 11 pages.

Ghanbari, et al., "Detecting DDOS Attacks Using an Adaptive-Wavelet Convolutional Neural Network", IEEE, no later than Dec. 31, 2021, pp. 1-7.

International Search Report and Written Opinion received for PCT Application No. PCT/US23/035357, Feb. 2, 2024, 13 pages.

Khan, et al., "A Polyscale Autonomous Sliding Window for Cognitive Machine Classification of Malicious Internet Traffic", Proceedings of the International Conference on Security and Management (SAM), no later than Dec. 31, 2015, pp. 96-103.

Tahir, et al., "A Novel Functional Link Network Stacking Ensemble with Fractal Features for Multichannel Fall Detection", Cognitive Computation, vol. 12, no later than Dec. 31, 2020, pp. 1024-1042.

International preliminary report on patentability Received in European Patent Application No. PCT/US2023/035357, mailed on May 22, 2025, 08 pages.

* cited by examiner

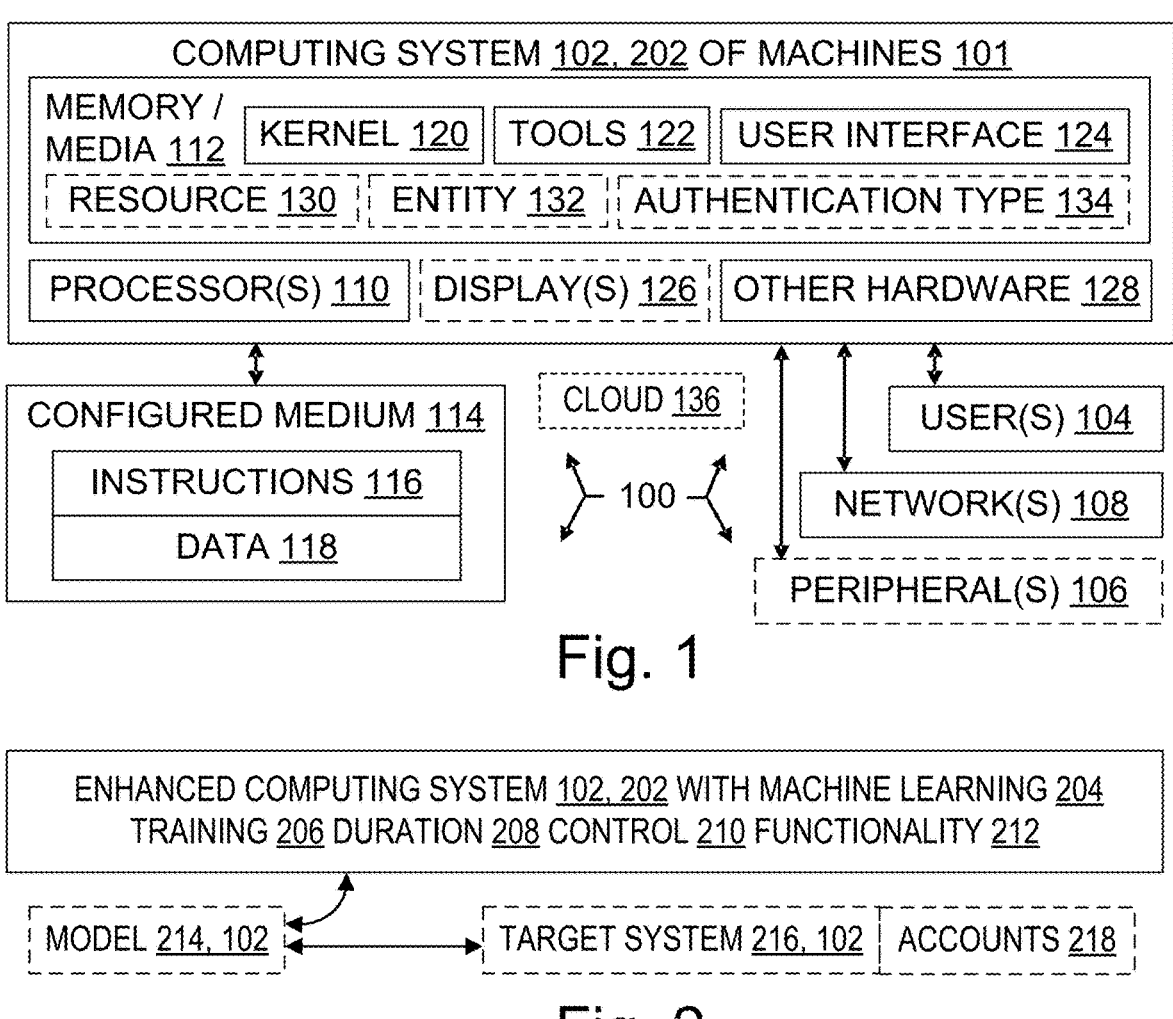
Fig. 1
Fig. 2
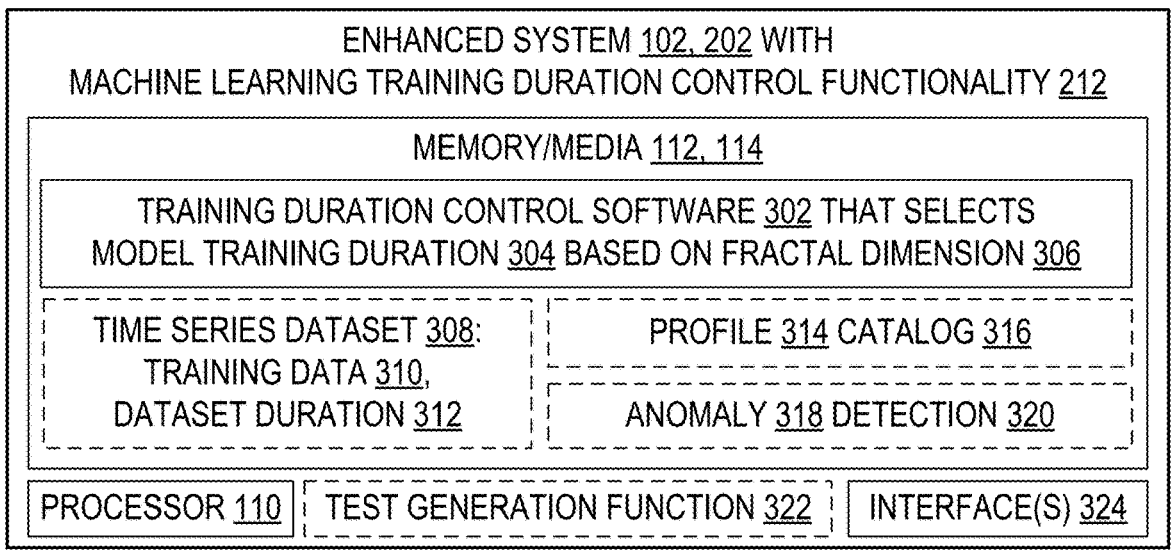
Fig. 3

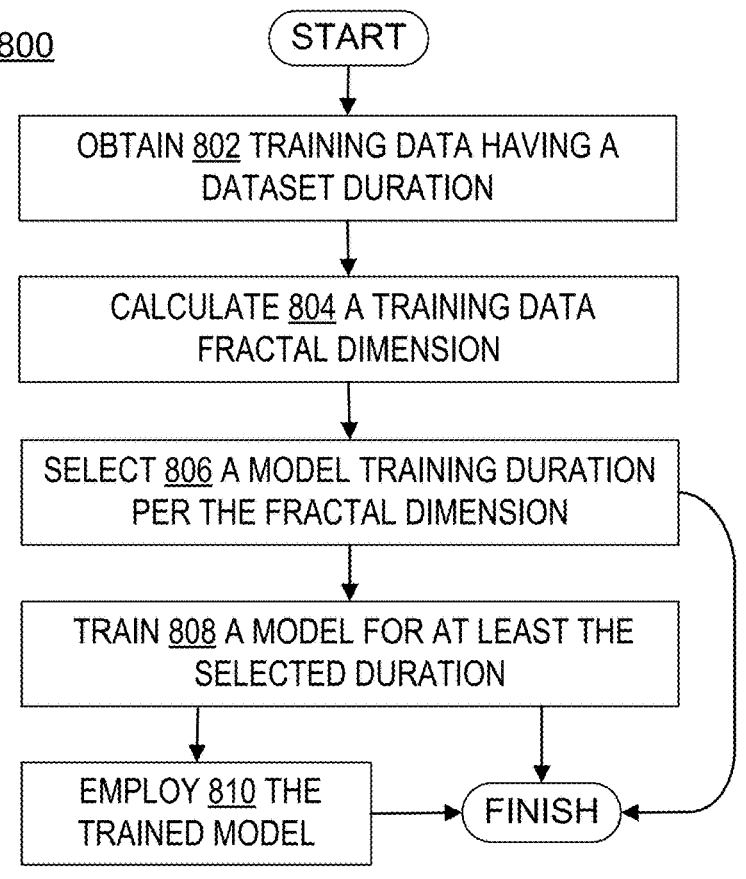

*800*

START

OBTAIN 802 TRAINING DATA HAVING A DATASET DURATION

CALCULATE 804 A TRAINING DATA FRACTAL DIMENSION

SELECT 806 A MODEL TRAINING DURATION PER THE FRACTAL DIMENSION

TRAIN 808 A MODEL FOR AT LEAST THE SELECTED DURATION

EMPLOY 810 THE TRAINED MODEL

FINISH

Fig. 8

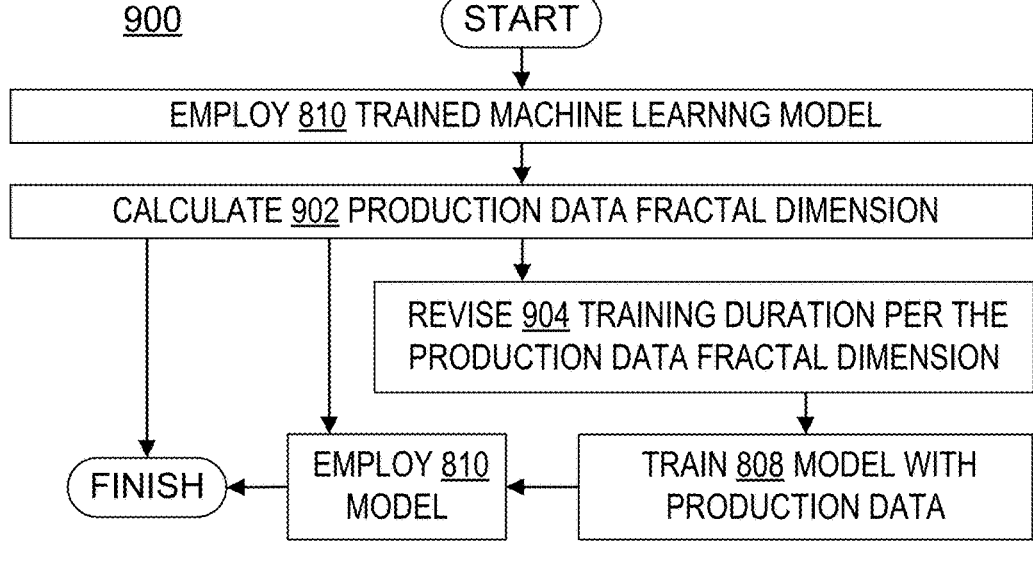

*900*

START

EMPLOY 810 TRAINED MACHINE LEARNNG MODEL

CALCULATE 902 PRODUCTION DATA FRACTAL DIMENSION

REVISE 904 TRAINING DURATION PER THE PRODUCTION DATA FRACTAL DIMENSION

FINISH

EMPLOY 810 MODEL

TRAIN 808 MODEL WITH PRODUCTION DATA

Fig. 9

EXAMPLE TRAINING DURATION CONTROL METHODS <u>1000</u>

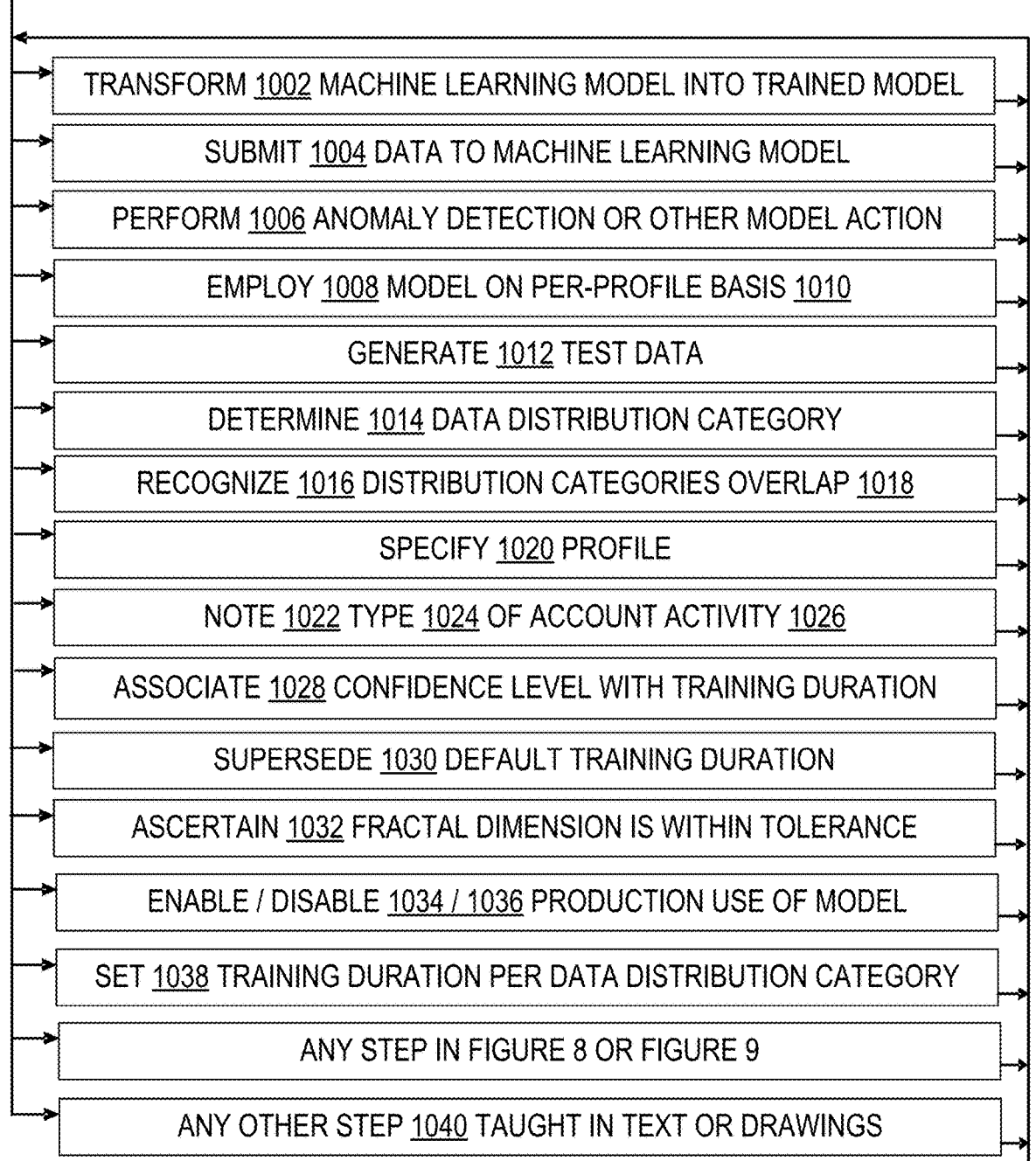

TRANSFORM <u>1002</u> MACHINE LEARNING MODEL INTO TRAINED MODEL

SUBMIT <u>1004</u> DATA TO MACHINE LEARNING MODEL

PERFORM <u>1006</u> ANOMALY DETECTION OR OTHER MODEL ACTION

EMPLOY <u>1008</u> MODEL ON PER-PROFILE BASIS <u>1010</u>

GENERATE <u>1012</u> TEST DATA

DETERMINE <u>1014</u> DATA DISTRIBUTION CATEGORY

RECOGNIZE <u>1016</u> DISTRIBUTION CATEGORIES OVERLAP <u>1018</u>

SPECIFY <u>1020</u> PROFILE

NOTE <u>1022</u> TYPE <u>1024</u> OF ACCOUNT ACTIVITY <u>1026</u>

ASSOCIATE <u>1028</u> CONFIDENCE LEVEL WITH TRAINING DURATION

SUPERSEDE <u>1030</u> DEFAULT TRAINING DURATION

ASCERTAIN <u>1032</u> FRACTAL DIMENSION IS WITHIN TOLERANCE

ENABLE / DISABLE <u>1034</u> / <u>1036</u> PRODUCTION USE OF MODEL

SET <u>1038</u> TRAINING DURATION PER DATA DISTRIBUTION CATEGORY

ANY STEP IN FIGURE 8 OR FIGURE 9

ANY OTHER STEP <u>1040</u> TAUGHT IN TEXT OR DRAWINGS

Fig. 10

MACHINE LEARNING TRAINING DURATION CONTROL

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made against a computing system. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective for the computing system. However, improvements in cybersecurity remain possible, and worth pursuing.

SUMMARY

Some embodiments described herein address technical challenges related to securing a computing system efficiently and effectively against threats. In some embodiments, the time spent training a machine learning model for anomaly detection, alert or incident clustering, attack forecasting, user activity classification, or other security operations is decreased while still controlling the risk that the training duration decrease will harm the model's accuracy. Thus, sufficiently trained models are produced faster, without loss of confidence in their accuracy, thereby enhancing the security of a target system whose activity is or will be monitored using the trained model.

Some machine learning training duration control embodiments described herein obtain a time series dataset containing training data which has a dataset duration, and calculate a training data fractal dimension of the training data. Based on the training data fractal dimension, these example embodiments select a machine learning model training duration. The machine learning model is trained for at least the training duration, thereby transforming the machine learning model into a trained machine learning model. The trained model is then employed as an anomaly detection tool, classification tool, clustering tool, forecasting tool, or other model-based tool, by submitting production data to the trained model and managing target system security in response to the model's resulting output.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including aspects generally suitable for systems which control machine learning training duration or benefit from such control, or both;

FIG. 2 is a diagram illustrating aspects of a computing environment which has one or more of the machine learning training duration control enhancements taught herein;

FIG. 3 is a block diagram illustrating an enhanced system configured with machine learning training duration control functionality;

FIG. 8 is a flowchart illustrating steps in some machine learning training duration control methods, with particular attention to selecting a training duration based on a training data fractal dimension;

FIG. 9 is a flowchart illustrating steps in some machine learning training duration control methods, with particular attention to confirming or revising a training duration based on a production data fractal dimension;

FIG. 10 is a flowchart illustrating steps in machine learning training duration control methods generally, incorporating FIGS. 8 and 9;

DETAILED DESCRIPTION

Overview

Figure 4:
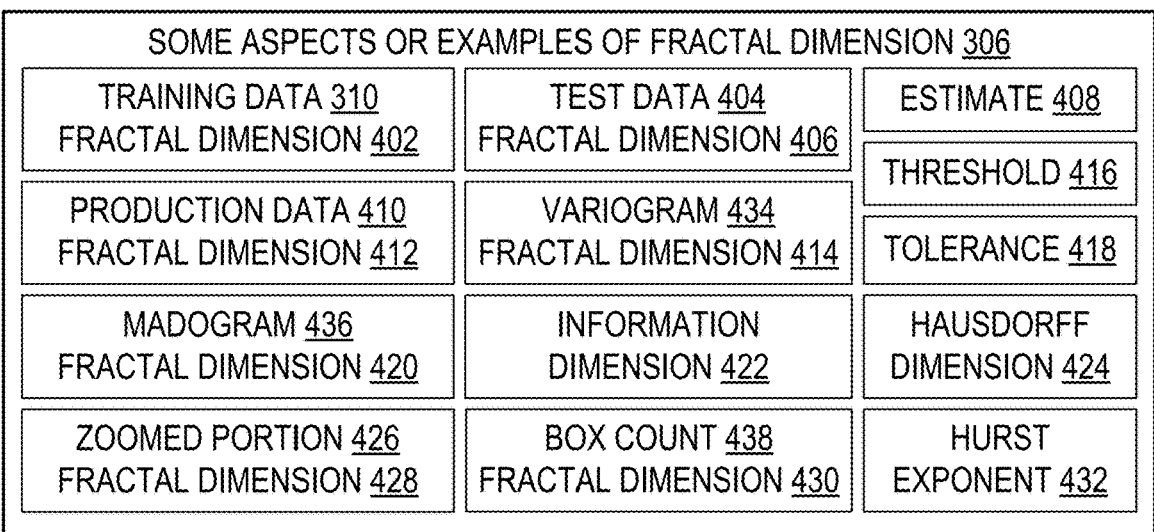
FIG. 4 is a block diagram illustrating some aspects and examples of a fractal dimension.

Various technical challenges arise from ongoing efforts to help administrators and security personnel secure sensitive data. For instance, some security mechanisms are based on signatures, e.g., some virus detection tools look for particular data signatures that indicate a virus, whereas other security mechanisms utilize machine learning. A machine learning model works most accurately (e.g., produces fewer false positives) when the model is trained using training data that is similar to the production data the trained model will process. For example, a model-based anomaly detection tool being installed for use by a customer Y will perform better when the tool's model is trained using training data that is derived from customer Y's production data. Recent production data also tends to provide better training data than older production data, at least if a customer's operating environment has changed recently, which is often the case.

However, in practice a week or more may often pass while the personnel who are tasked with training the model on-site obtain production data of the particular customer, format and enhance it appropriately for use as training data (e.g., by adding labels), and feed it to the model being trained. During that training time, oftentimes the model is not performing at a level lower than the desired level of performance.

In particular, many IDSs (Intrusion Detection Systems) are based on a learned state of normal activity. Significant deviation from this state can indicate a malicious activity that has adverse security impact, so the deviation should be detected by the trained model and cause the IDS to raise an alert. Using a learned normal state allows an IDS to increase the accuracy of alerts by filtering out cases which are impactful yet common and thus are less interesting to security tools such as exfiltration prevention tools, and avoid wasting security personnel time and effort. However, training the model's state requires relatively long periods of time pass until enough confidence is gained that the state is representing expected behavior of the monitored system. This passage of time creates a technical problem, which is how to decrease the TTD (Time-To-Detect) of alerts without sacrificing model accuracy.

In almost any case, the model training time could be shortened by feeding the model less training data. But less training data means less training, which creates a substantial risk that the model will not be sufficiently trained to perform as desired. Accepting less accuracy in exchange for a shorter training time is also risky due to spikes or seasonality. For instance, suppose the training time is cut from one week to three weekdays. If normal activity includes a weekly backup job each weekend, then the model that is trained only on weekday data will produce false positives when it is given the weekend data to check for anomalies.

In theory, the model training time could also be shortened by improving the model's internal processing structure, e.g., the detection algorithm. But such improvements to the model's structure may not be readily available. Sometimes insights from domain-specific expertise are obtained and applied to improve a model's algorithm, but the availability of such insights varies enormously between different models and different model installations.

Accordingly, some embodiments taught herein provide an automated method to reduce model training time without unduly sacrificing model performance. For instance, an adaptation of fractal dimension metrics is used as a training data quality metric. When training data variable values have a fractal quality discussed herein, increasing the scale or learning period doesn't improve the model. Thus, the state learning period (e.g., TTD) can be lowered, in some situations enormously, e.g., from weeks to minutes. Some embodiments described herein also use this insight to simulate production data accurately and quickly, e.g., to generate traffic that exercises the model the same way actual production data will exercise the model. This allows tests to raise real end-to-end alerts on demand, and almost instantly. This generation of accurate test data does not require a new training period after alerts have been generated, thus, generating test data does not affect the overall security coverage.

Some embodiments taught herein obtain a time series dataset containing training data and having a dataset duration, calculate a training data fractal dimension of the training data, select a machine learning model training duration based at least in part on the training data fractal dimension, train the machine learning model for at least the training duration to transform the machine learning model into a trained machine learning model, and employ the anomaly detection tool after the training by submitting production data to the trained machine learning model. A benefit provided by these embodiments is training an anomaly detection tool in a shorter time frame than without the fractal dimension utilization. Another benefit is a greater certainty that the desired training is in place than would be provided by guessing at how long the training period (a.k.a. training duration) should be, or by a cycle of training with a chunk of data, testing performance, further training, further testing, and so on.

In some embodiments taught herein, an anomaly detection tool is configured to perform anomaly detection on a per-profile basis. A benefit is that the detection training is more efficient than approaches which simply train every profile for the same default training duration, e.g., one week, because different profiles have different respective sufficient training durations. One week may be more than sufficient for one profile, sufficient for another profile, and insufficient for a third profile.

In some embodiments, at least one profile includes a minimum spike count for the training data. This provides the benefit of greater certainty that the desired training is in place when the minimum spike count is reached, while still allowing the efficiency associated with training that recognizes different profiles may have different respective sufficient training durations. This spike count also serves as a validation check on the training data, e.g., data that spans a long enough time but lacks enough spikes is not sufficient data for training. This spike count also helps when generating training data, e.g., the generated data should have at least as many spikes as the training data.

In some embodiments, at least one profile includes a training data distribution category. This provides the benefit of greater certainty that the desired training is in place, while still allowing the efficiency associated with training that recognizes different profiles may have different respective sufficient training durations. This data distribution also serves as a validation check on the training data, e.g., data that is long enough but has the wrong kind of distribution is not sufficient for training. This data distribution recognition also helps when generating training data, e.g., the generated data should have the same kind of distribution as the training data and also have a similar fractal dimension.

Some embodiments note that training data represents activity by a machine-driven account. Recognizing this provides the benefit of a reduced training time with confidence that the training will still be sufficient, because the behavior of an automated account is unlikely to change.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 124 supports interaction between an embodiment and one or more human users. In some embodiments, the user interface 124 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps, on mobile devices 102 or workstations 102 or servers 102, as well as APIs, browsers, or webpages and the corresponding software for protocols such as HTTPS, for example. Files, APIs, endpoints, and other resources 130 may be accessed by an account 218 or set of accounts, user 104 or group of users 104, IP address or group of IP addresses, or other entity 132. Access attempts may present passwords, digital certificates, tokens or other types 134 of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, machine learning training duration control functionality 212 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, resources, entities, or other items in a computing environment, which are disclosed herein but not associated with a particular reference numeral herein. Corresponding drawings may also be added.

More About Systems

FIG. 2 illustrates a computing system 102 configured by one or more of the machine learning training duration control enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 illustrates an example enhanced system 202 which is configured with machine learning training duration control software 302 to provide functionality 212. Software 302 and other FIG. 3 items are discussed at various points herein, and additional details regarding them are provided in the discussion of a List of Reference Numerals later in this disclosure document.

FIG. 4 shows some aspects and examples of fractal dimension 306. This is not a comprehensive summary of all aspects of fractal dimensions or all aspects of machine learning training duration control functionality 212 involving a fractal dimension. Nor is it a comprehensive summary of all aspects of an environment 100 or system 202 or other context of fractal dimensions, or a comprehensive summary of all machine learning mechanisms 214 for potential use in or with a system 102. FIG. 4 items are discussed at various points herein, and additional details regarding them are provided in the discussion of a List of Reference Numerals later in this disclosure document.

Figure 5:
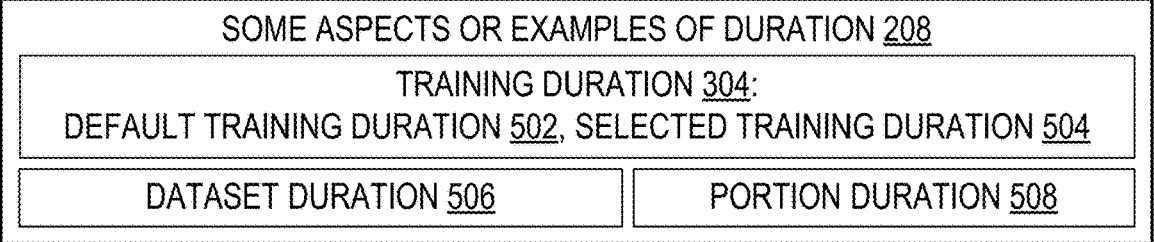
FIG. 5 is a block diagram illustrating some aspects and examples of a duration.

FIG. 5 illustrates some aspects and examples of duration 208. FIG. items are discussed at various points herein, and additional details regarding them are provided in the discussion of a List of Reference Numerals later in this disclosure document.

Figure 6:
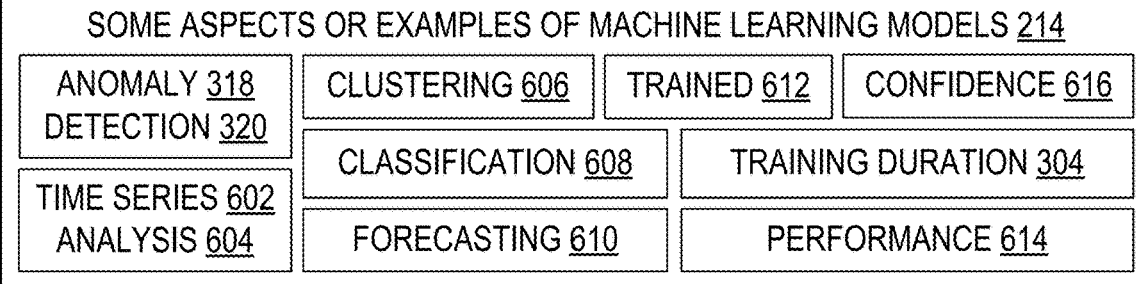
FIG. 6 is a block diagram illustrating some aspects and examples of a machine learning model.

FIG. 6 illustrates some aspects and examples of machine learning models 214. FIG. 6 items are discussed at various points herein, and additional details regarding them are provided in the discussion of a List of Reference Numerals later in this disclosure document.

Figure 7:
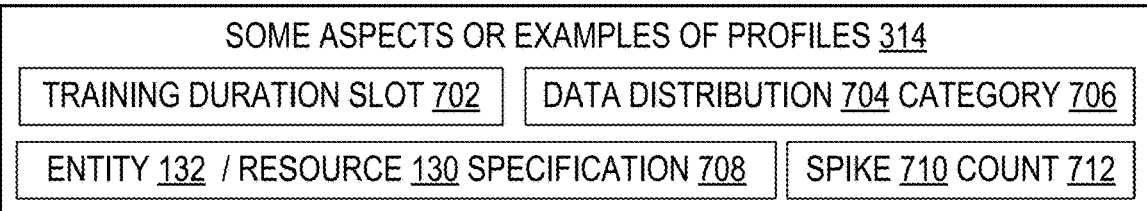
FIG. 7 is a block diagram illustrating some aspects and examples of a machine learning model profile.

FIG. 7 illustrates some aspects and examples of machine learning profiles 314. FIG. 7 items are discussed at various points herein, and additional details regarding them are provided in the discussion of a List of Reference Numerals later in this disclosure document.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments obtain 802 some training data 310, calculate 804 a fractal dimension 306 of the training data, select 806 a training duration 304 based on the fractal dimension, train 808 a machine learning model 214 for at least the training duration, and then employ 810 the trained machine learning model, e.g., for anomaly detection 320.

In some embodiments, an anomaly detection computing system 202 which utilizes machine learning includes: a digital memory 112; an anomaly detection tool 122 having a machine learning model 214; and a processor 110 in operable communication with the digital memory. The processor is configured to perform machine learning operations which include training duration control 210. The machine learning operations include: obtaining 802 a time series dataset 308 containing training data 310 and having a dataset duration 312, calculating 804 a training data fractal dimension 402, 306 of the training data, selecting 806 a machine learning model training duration 304, 208 based at least in part on the training data fractal dimension, training 808 the machine learning model for at least the training duration and thereby transforming 1002 the machine learning model 214 into a trained machine learning model 612, 214, and employing 810 the anomaly detection tool 122 after the training by submitting 1004 production data 410 to the trained machine learning model.

As a terminology clarification, a machine learning model "training duration" herein means the duration of timestamps in training data, not the amount of wall clock time spent training the model. For example, training data that has a one-hour duration (e.g., earliest timestamp 1:07 and latest timestamp 2:07) could be processed by a model and thus help train the model, within 30 seconds of wall clock time in some implementation. In some contexts, a training duration is called a "training period". However, the term "training duration" is preferred herein to avoid confusion with the implication "periodic" that might arise from the word "period". "Duration" simply means a length of time, but "period" involves both a length of time and the possibility of data repetition, e.g., "the sine wave has a period". The training duration 304 may be referred to as a training period, subject to the understanding that the data in the training period is not necessarily repeated even though "training period" includes the word "period".

As another terminology clarification, in some contexts "fractal dimension" and "Hausdorff dimension" are used to mean the same thing. However, the term "fractal dimension" is preferred herein. "Fractal dimension" is the more general term, coined by Benoit Mandelbrot. A Hausdorff dimension 424 is a measure of fractal dimension 306, is not the only such measure, and thus "Hausdorff dimension" is more specific than "fractal dimension".

Some embodiments utilize one or more profiles 314. A profile may be defined 1020 by specifying 708 the entity 132 accessing a resource 130 (a.k.a., the actor 132) or be defined 1020 by specifying 708 the resource 130 to be accessed or that was accessed or that s being accesses, or the profile 314 may be defined by both entity and resource. In some embodiments, each profile 314 can have its own training duration, so one benefit of training a model to operate on a per-profile basis 1010 (separating training data for a profile P1 from training data for a profile P2, and so on) is that some models will have shorter training durations than other models. By contrast, a model that does not operate on a per-profile basis has a training duration that is the maximum of all the training durations of the intermingled data that is not separated by profile.

In particular, in some embodiments, an anomaly detection tool 122 model 214 is configured to perform anomaly detection on a per-profile basis. In some of these, the computing system 202 includes a catalog 316 of profiles 314 configuring the digital memory. In some of these, each profile 314 includes a training duration slot 702, and at least one of: an entity 132 specification 708, or a resource 130 specification 708.

For example, a profile A may have training data containing potential exfiltration events in which a sender entity is a private IP address of a local network and a receiver entity is not (hence, is external to the local network), a profile B may have training data containing potential lateral movement events in which both sender and receiver are private IP address entities, and a profile C may have training data containing potential attack events in which the resource 130 is any database or file labeled as top secret. Due to the different amounts of events for each set of training data, and the different spread of what constitutes normal activity, each profile likely has a different training duration under the present teachings.

Different embodiments may implement different options for profiles 314. One option is to keep track not only of training duration 304 using the slot 702 but also track how many spikes 710 are in the training data. Thus, for a particular profile the training data is not treated by some embodiments as sufficient unless, e.g., it is at least two hours long and also has at least three spikes.

Another option (not mutually exclusive of the spike-tracking option) is to keep track not only of the training data's duration but also track the training data's distribution 704. Training data distribution may be used in a validation check on the training data, e.g., if certain data is long enough (timestamps duration) but is not the correct kind of distribution, then that data is treated as not valid for use as training data, or at least as not sufficient on its own. Tracking the training data distribution 704 also helps when generating 1012 training data for model testing or demonstrations of the model, e.g., the generated data should have the same kind of distribution and a similar fractal dimension as the training data. Some examples of distributions 704 include uniform, Poisson, normal, binomial, Benford's law, Zipf's law, and random. A distribution category 706 includes one or more distributions, or a range of permitted values for the parameters that define a distribution. For example, a given category 706 may be limited to normal distributions or may be broader in order to also include other bell-shaped curves.

Accordingly, in some embodiments at least one profile includes at least one of: a minimum spike count 712 for the training data, or a training data distribution category 706.

Some embodiments provide or utilize a test data generation function 322. In some, the generated test data 404 has a fractal dimension 406 that is close to the training data's fractal dimension 402, or has the same distribution 704 as the training data, or both. The data 404 generated by a generating function 322 may vary widely, depending on the particular embodiment, particular profile 314, or other circumstances. In particular, a generating function 322 may generate data 404 having a desired quality, such as a specific fractal dimension 306 (within a defined tolerance 418) under a particular metric 422, 424, 432, 434, 436, or 438.

Some embodiments include a test data generation function 322 which upon execution by the processor 110 generates anomaly detection 320 tool 122 test data 404 which is characterized in at least one of the following ways: the generated test data has a test data fractal dimension 406 that is within a predefined tolerance 418 of the training data fractal dimension 402; or the generated test data 404 has a test data 404 distribution 704 category 706 that overlaps a training data 310 distribution 704 category 706 of the training data 310.

In some embodiments, a test data generation function 322 for generating 1012 data is implemented using, for example, one or more of the following: a library of waveform samples, a library of distribution functions, production data samples, test data samples, waveform simulation software, function generation software, random or pseudorandom value generation software, a library of functions having known and different Hausdorff dimensions, or software designed to combine or modify functions by the addition of functions, multiplication of functions, function scaling, repetition, concatenation, or other operations on functions. In this context, a "function" is a mapping from a domain of values into a range of values.

Although anomaly 318 detection 320 is an example discussed herein, it is not the only relevant use of machine learning 204. Teachings herein may also or instead be applied to control training duration 304 for machine learning models 214 which are being trained to perform, e.g., time series analysis 604, clustering 606, classification 608, or forecasting 610.

Other system embodiments are also described herein, either directly or derivable as system versions of described processes or configured media, duly informed by the extensive discussion herein of computing hardware.

Although specific machine learning training duration control 210 architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of machine learning training duration control functionality 212, for example, as well as different technical features, aspects, security controls, mechanisms, rules, criteria, expressions, hierarchies, operational sequences, data structures, environment or system characteristics, or other functionality 212 teachings noted herein, and may otherwise depart from the particular illustrative examples provided.

Processes (a.k.a. Methods)

Methods (which are also be referred to as "processes" in the legal sense of that word) are illustrated in various ways herein, both in text and in drawing figures. FIGS. 8, 9, and 10 each illustrate a family of methods 800, 900, 1000 respectively, which are performed or assisted by some enhanced systems, such as some systems 202 or another functionality 212 enhanced system as taught herein. Method family 800 and method family 900 are each a proper subset of method family 1000. FIGS. 1 through 7 show machine learning training duration control architectures with implicit or explicit actions, e.g., steps for accessing a profile catalog 316 or a profile 314, launching a test generation function 322, calculating a fractal dimension using a particular metric 422, 424, 432, 434, 436, or 438, executing a tool 122, or otherwise processing data 118, in which the data 118 include, e.g., data representing a resource 130, entity 132, authentication 134, duration 208, model 214, account 218, or fractal dimension 306, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some embodiments a human 104 types in a value for the system 202 to use as a profile 314 name. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 10. FIG. 10 is a supplement to the textual examples of embodiments provided herein and the textual descriptions of embodiments provided herein. In the event of any alleged inconsistency, lack of clarity, or excessive breadth due to an aspect or interpretation of FIG. 10, the text of this disclosure shall prevail over that aspect or interpretation of FIG. 10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 10 to be non-operable, the sequence S is not within the scope of any claim. Any assertion otherwise is contrary to the present disclosure.

Some embodiments provide or utilize a machine learning training method with training duration control, the method performed (executed) by a computing system 202, the method including: obtaining 802 a time series dataset 308 containing training data 310 and having a dataset duration 312; calculating 804 a training data fractal dimension 402 of the training data; and selecting 806 a machine learning model training duration 304 based at least in part on the training data fractal dimension. Some method embodiments also include training 808 the machine learning model with at least a portion 426 of the time series dataset, the portion having a portion duration 508 which is at least the training duration 304, the training transforming 1002 the machine learning model into a trained machine learning model 612, 214.

For example, suppose a first training dataset D1 has a fractal dimension of 0.7 and the embodiment is configured with 1.0 as a minimum acceptable fractal dimension for training. Then D1 would not provide model training that is deemed sufficient; additional or different training data (or a different model) would be required for sufficient training.

Suppose further that after additional production data is obtained 802, thus expanding D1 to produce D2, a calculation 804 produces a D2 fractal dimension of 1.1. Since this value 1.1 is above the embodiment's threshold of 1.0, dataset D2 is deemed sufficient. Accordingly, the embodiment's machine learning model is trained 808 using D2.

In this example and similar scenarios, use of a fractal dimension as a training data sufficiency metric provides a significant security benefit. For example, if the dataset duration of D2 is 185 hours, and the default training period 502 (which does not consider fractal dimensions) for products that use the same kind of machine learning model as the embodiment is 240 hours, then the embodiment's training duration has been reduced by 55 hours (over 20%). In the particular case of a model performing anomaly detection, the model's TTD is reduced by over 20%, thus increasing the security of the system 216 whose activities are targeted by the model to provide protection.

As a further example, assume a trained model 214 has been put into production, such as when a trained anomaly detection model 214, 122 is enabled at a customer site by turning on detection, for instance. In some of these situations, some embodiments will discover that the fractal dimension 412 of the production data 410 is different than the fractal dimension 402 of the training data 310, and will revise 904 the training duration accordingly.

As a specific example scenario, assume that a training data fractal dimension 402, denoted FracDim_train, indicates that two hours of training is sufficient, so detection is turned on after two hours of training. The production data 410 being sent to the trained model is recorded. After three hours with detection turned on, the system 202 computes a fractal dimension 412 of the three hours of production data, denoted FracDim_prod. Assume there is a significant difference between FracDim_train and FracDim_prod, and assume that FracDim_prod indicates that training 808 on four hours of data would make the model 214 more accurate. In response, the training duration is revised 904 from two hours to four hours, the model 214 is taken offline 1036 and trained 808 with another two hours of data, and then the model 214 is put back online 1034.

More generally, in some embodiments the training duration 304 (a.k.a. baseline period 304) can be revised 904 as more data is gathered, even after detection was enabled with some initial baseline training. In a variation, in some embodiments a spike detection threshold 416 is also dynamic. For instance, in one example scenario an extremely significant spike 710 is flagged 320 as an anomaly 318 after an initial two hours of training, and a less significant spike 710 is flagged 320 after four hours of training, because the additional training has made the model more sensitive.

In some embodiments, the method includes employing 810 the trained machine learning model after the training by submitting 1004 production data to the trained machine learning model; calculating 902 a production data fractal dimension of the production data; and revising 904 the training duration based at least in part on the production data fractal dimension. In some of these embodiments, the model was trained 808 using data 310 deemed sufficient in view of that data's fractal dimension. In other embodiments, the model was trained 808 without regard to the fractal dimension of the training data, e.g., the fractal dimension which was first considered in connection with the model was the production data fractal dimension 412.

More generally, a fractal dimension 306 may be calculated 804 for one or more of: any training data or any potential training data or any production data or any protentional production data, at any point in the lifespan of a model 214. Fractal dimensions 306 beneficially quantify data quality characteristics relative to the model, such as the expected training sufficiency of the data, or the actual conformance of the data with the model's training data.

Some embodiments determine there is sufficient training data 310 by determining that the training data overall and a zoomed portion 426 of the training data have the same data distribution 704 as each other and also have the same fractal dimension 306 as each other. In a variation, the data distributions are in the same category 706, e.g., bell-curve distributions, or exponential distributions, but are not necessarily the same as one another. In another variation, the fractal dimensions are within a defined tolerance 418 of each other, e.g., 0.3, or 10% of the smaller fractal dimension value, or 5% of the average of the fractal dimension values, but are not necessarily the same as one another.

In some embodiments, selecting 806 the machine learning model training duration based at least in part on the training data fractal dimension includes: calculating 804 a zoomed portion fractal dimension 428 of a zoomed portion 426 of the training data 310; determining 1014 a zoomed portion distribution category 706 of the zoomed portion; determining a training data distribution category 706 of the training data; recognizing 1016 that the zoomed portion distribution category and the training data distribution category overlap 1018; and ascertaining 1032 that the zoomed portion fractal dimension is within a predefined tolerance 418 of the training data fractal dimension.

In some embodiments, the training 808 includes transforming 1002 the machine learning model into a trained machine learning model which performs anomaly detection 320 on a per-profile basis 1010 for multiple profiles 314, each profile 314 having a respective entity specification 708, or a respective resource specification 708, or both. In some, the profiles each have the same distribution 704, and in some they have the same distribution category 706. These or other profile variations are also present in some embodiments which perform 1006 model 214 actions other than anomaly detection 320, e.g., clustering 606, classification 608, forecasting 610, or time series analysis 604. In some embodiments, a form of clustering 606, classification 608, forecasting 610, or time series analysis 604 are performed as part of anomaly detection 320.

In some embodiments, generating 1012 test data is characterized in at least one of the following ways: the generated test data 404 has a test data fractal dimension 406 that is within a predefined tolerance of the training data fractal dimension 402; or the generated test data 404 has a test data distribution category 706 that overlaps 1018 a training data distribution category 706 of the training data.

Some embodiments use an authentication type 134 to heuristically define one or more profiles 314. In some embodiments, training 808 includes transforming the machine learning model into a trained machine learning model which performs operations on a per-profile basis for multiple profiles, at least one profile specified 1020 by at least an authentication type. For example, a profile specification 708 may include (or exclude) password authentication, or multifactor authentication, or federated authentication. Similarly, a profile authentication specification 708 may include (or exclude) certain keys, or certain authentication scopes of this auth, profile parameters, thus higher resolution data.

Some embodiments calculate a fractal dimension in one or more different ways. Unless otherwise stated, fractal dimension estimates 408 are permitted. That is, exact fractal dimension 306 values are not required for an embodiment to operate, unless the requirement for an exact value is stated expressly. Thus, the terminology "fractal dimension" and any reference using reference numeral 306, 402, 406, 412, 414, 420, 422, 424, 428, 430, 432, 804, or 902 are understood to presumptively mean "estimated or exact fractal dimension", where the estimate is within a predefined tolerance in a given embodiment. The tolerance may be defined by using absolute deltas (e.g., +/−0.1), by using relative deltas (e.g., +/−5%), or by specifying ranges, for example.

In some embodiments, calculating 804 the training data fractal dimension of the training data includes calculating at least one of the following: a box count 438 fractal dimension 430 estimate 408 (Hall-Wood is a version of box count 438); a Hurst exponent 432 estimate 408; an information dimension 422 estimate 408; a variogram 434 fractal dimension 414 estimate 408; or a madogram 436 fractal dimension 420 estimate 408.

Some embodiments implement a presumption that behavior of an automated account 218 is unlikely to change, and thus the training duration 304 is reduced with greater confidence that the training will still be sufficient, than for non-automated accounts 218. Some embodiments include at least one of: noting 1022 that training data 310 represents activity 1026 by a machine-driven account 218; or noting 1022 that training data 310 represents activity 1026 by a human-driven account 218.

Some embodiments produce or utilize a confidence level 616 for the training duration 304, with the confidence level indicating how confident the system 202 is that the training duration is sufficient. A variation is to have an estimate of how much more training data would be required in order to reach a particular confidence level. The confidence level 616 is based on, e.g., how far away the training data fractal dimension is from a target fractal dimension in a lookup table that maps fractal dimensions to training durations, or how closely the training data distribution fits a recognized distribution, or both. Some embodiments associate 1028 a confidence level with the training duration.

In some situations, the training duration is shortened by utilizing an embodiment. That is, the training duration that is selected 806 using the training data fractal dimension is smaller than a fixed training period that would have been used if the training data's fractal dimension was not calculated or was ignored. For instance, an intrusion detection system might have a default setting 502 that requires processing one week of training data 310 prior to enabling 1034 detection, but the training period is shortened to four hours based on the confirmed 804, 806 fractal nature of the training data.

More generally, in some embodiments, the selected 806 machine learning model training duration supersedes 1030 a default training duration 502, the default training duration is free of reliance on the training data fractal dimension, and the selected machine learning model training duration is smaller than the default training duration.

In some situations, the training data 310 is complicated and is also fractal. Some embodiments identify 1014 periodic data (which includes constant data as a special case), some identify 1014 randomly distributed data, and some identify 1014 both. After the identification, a training duration may be shortened without calculating a fractal dimension. Periodic data and randomly distributed data are relatively rare, but when they are efficiently identified computational savings can be obtained by setting 1038 the training period without calculating a fractal dimension. For periodic data, the duration of one period may be used as a training duration. For random data, a duration having a predefined number of data points may be used as a training duration. Some embodiments set 1038 the training duration for relatively primitive cases (such as constant or random data), or for probabilistic or distribution-based methods that have a probability to generate specific amounts of signals per period. The latter are not constant or random, but still can be learned after a relatively short time period.

Some embodiments enforce a selection 806 requirement that training data have a fractal dimension greater than a specified cutoff 416, e.g., greater than one, or greater than 1.1, in terms of the Hausdorff dimension 424. In some, the training data fractal dimension 402 is a Hausdorff dimension greater than one. In some, the training data is non-periodic and is not randomly distributed.

Some embodiments calculate 804 a fractal dimension for a first duration, and for a second longer duration, and for a third even longer duration, and check whether the calculated fractal dimension values are trending or converging on a particular value which is deemed to indicate a corresponding forecast or projected sufficient duration 304. For instance, suppose at one hour the fractal dimension D1 is 0.7, at two hours D2 is 0.8, and at three hours D3 is 0.9. Suppose also that a fractal dimension of at least 1.1 is considered to indicate sufficient training data. Then by projection, the sufficient duration is five hours (D5 would be 1.1).

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as machine learning model training duration control software 302, duration variables and other data structures 304, fractal dimension variables and other data structures 306, profile 314 catalogs 316, test data generation function software 322, and fractal dimension calculation software for various metrics 422, 424, 426, 432, 434, 436, or 438, in the form of data 118 and instructions 116, read from a removable storage medium 114 and/or another source such as a network connection, to form a configured storage medium. The configured storage medium 112 is capable of causing a computer system 202 to perform technical process steps for machine learning model training duration control, as disclosed herein. The Figures thus help illustrate configured storage media embodiments and process (a.k.a. method) embodiments, as well as system and process embodiments. In particular, any of the process steps illustrated in FIG. 8, 9, or 10 or otherwise taught herein may be used to help configure a storage medium to form a configured storage medium embodiment.

Some embodiments use or provide a computer-readable storage device 112, 114 configured with data 118 and instructions 116 which upon execution by a processor 110 cause a computing system to perform a machine learning training method with training duration control, the method performed by a computing system in a cloud computing environment 136, 100 or another computing environment 100. This method includes obtaining 802 a time series dataset containing training data and having a dataset duration; calculating 804 a training data fractal dimension 402 of the training data; selecting 806 a machine learning model training duration based at least in part on the training data fractal dimension; and training 808 the machine learning model with at least a portion of the time series dataset, the portion having a portion duration which is at least the training duration, the training transforming 1002 the machine learning model into a trained machine learning model.

In some embodiments, the training includes transforming 1002 the machine learning model into a trained machine learning model which performs 1006 at least one of the following: anomaly detection 320, time series analysis 604, clustering 606, classification 608, or forecasting 610.

In some embodiments, the method further includes the trained machine learning model performing 1006 anomaly detection 320 on a per-profile basis 1010. For example, after adding new storage to a monitored system 216, a model 214 is trained to learn usual behavior of access to that new storage so the model can detect a spike or other anomaly 318.

In some embodiments, the method further includes generating 1012 test data having a test data fractal dimension that is within a predefined tolerance of the training data fractal dimension.

In some embodiments, the training data fractal dimension 402 is a Hausdorff dimension 424 greater than one, and the training data 310 is non-periodic and is not randomly distributed.

Additional Observations

Additional support for the discussion of machine learning training duration control functionality 212 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide technical benefits such as a shorter time-to-detection and prompt realistic demonstration capability, by virtue of their recognition and generation of variables with fractal quality, leading to a shortened learning period for accurate production of stateful alerts.

Some security tools build stateful security alerts on top of a time series model, which may include a profile. However, learning the time series structure can take a model 214 a lot of time, e.g., several weeks. This is problematic for security features and also affects the perception of security. Some embodiments taught herein flag profiles using an adaptation of a fractal dimension metric for a time series. For variables having fractal dimensions, a state learning 808 period 304 (and thus TTD—Time to Detect) can be lowered drastically, e.g., from weeks to minutes, thereby significantly increasing the security value of a model-based tool 122. Some embodiments also apply these teachings in an app that generates 1012 test data, e.g., simulated production data. This test data, e.g., simulated traffic, can be used 810 to raise real end-to-end alerts at will and almost instantly, which is very useful for demonstrating the security capabilities with real detections, development, monitoring, etc.

Many IDSs (Intrusion Detection Systems) 122 are based on a learned state of normal activity. Significant deviation from this state can indicate a malicious activity with potential security impact and is expected to raise an alert. Using state allows a model 214 to increase the accuracy of alerts by filtering out cases which are impactful yet common and thus are less interesting. However, training 808 the state requires relatively long periods of time until enough confidence is gained that the state is representing expected behavior. This creates a problem of how to decrease the TTD (Time-To-Detect) of alerts.

A short (or at least shortened) Time-to-Detect is beneficial for several reasons. It helps provide security value faster to customers, instead of only after a prolonged period of time, thereby increasing the return on investment of the service 122 (in this context, a security service is a form of security tool 122). It allows customers to test the capabilities of the service 122 by intentionally triggering the detection logic and witnessing the value of the service's operations. It allows sales and marketing personnel of the security service vender to demonstrate the value of the product 122 quickly and easily, by triggering the stateful alerts.

In some embodiments, the model 214 state can be built 808 per resource 130 (such as storage account or virtual machine) or per entity 132 (such as user, group of users, or application). Entity-level states representing normal and expected behavior may be referred to as an entity's profile 314.

In some embodiments, the model 214 state is represented as a time-series 602 of some monitored quantity (e.g., amount of activity, appearance of new entities, or important events) over a timeline. This could be a time series with significant time-dependent components (e.g., trend and seasonality), or time series stationary process (independent of time in that the mean, variance and autocorrelation structure do not change over time). In some scenarios, the vector includes or consists of non-events (e.g., no signal) and events (e.g., signal appears).

In many scenarios, training and maintaining the model state at a profile level 1010 (either individual or per group of similar entities) promotes both efficiency and accuracy. Thus, some embodiments define 802 the variable to measure (e.g., amount of data extracted per each database query) per profile 1010 (e.g., per application). After the model learns sufficient state and model installers gain confidence in the model's accuracy, a detection stage or other production stage of the model is enabled 1034. In the production stage of an exfiltration detection model, for example, each query extracting much more data than expected per state of that profile will lead the model 122 to raise an alert.

When the time-series representing the state is non-stationary, or has a low signal-to-noise ratio, learning 808 it effectively requires lengthy periods of time. For example, in case of some scenarios with data seasonality, a sufficient model training duration includes at least two complete seasonality sections. As an example of seasonality, weekly seasonality is common, which sets the minimal (i.e., sufficient) learning period at two weeks.

In addition, in some scenarios the model state is dynamic and sensitive to outliers. As a result, deviations from the state not only trigger alerts, but also update the state to prevent multiple alerts being triggered by similar events.

For purposes of testing the IDS or other model-based tool 122, either during development or continuously when the tool is enabled 1034 in production, these characteristics are problematic. Seasonality, outlier sensitivity, non-stationary data, or data with a low signal-to-noise ratio, alone or in combination increase the training time to reach a stable model state. Moreover, when a stable model state is reached, submitting an outlier to the model for testing changes the model state significantly; it may even require starting the training period anew, which again degrades the overall security coverage and quality.

Some environments include an application which performs a similar recurring operation each time window. This is sometimes referred to as a heartbeat application or a heartbeat simulator. Since this activity is very stable, any different activity coming from the heartbeat application is regarded as very anomalous. A simulation of this heartbeat data, or other production data, can be generated by a separate test data generation function 322. However, this heartbeat test data generation does not, by itself, solve the problems described above.

Some embodiments addressing these problems (e.g., long training duration, undesired re-training due to outlier testing) by providing a computationally efficient way to identify stable profiles using an adaptation of fractal quality metrics. For variables having the fractal quality discussed herein, increasing the scale or learning period doesn't improve the model. Accordingly, the state learning period (and thus TTD) can be lowered drastically, e.g., from weeks to minutes in scenarios where the training data is fractal and is identified as fractal. Some embodiments also use this fractal-based logic in a simulated heartbeat app, which will generate heartbeat traffic and allow a system user to raise real end-to-end alerts at will and almost instantly. Moreover, this method will not require a new training period after alerts have been generated, and accordingly does not adversely affect the overall security coverage.

In some circumstances, a definition of a scaling relationship is given by Formula 1 below.

$$N = S^{-D} \tag{Formula 1:}$$

where N is a parameter (e.g., measure length of a curve), S is a scaling parameter (e.g., when scaling down by 10, S=0.1) and D is the fractal dimension. Rearranging leads to:

$$D = -\frac{\log(N)}{\log(s)} \tag{Formula 2}$$

For constant variables, D=1 as scaling down does not affect the value. Variables generated by a scale-independent (or time-independent, in case of time series) process (taken from a distribution or generated by a function) have values similar to 1. Variables that are scale-dependent (or time-dependent) have values of D very different from 1. Some other dimension metrics conveying a fractal dimension provide an information dimension 422, or a box-counting dimension 430, for instance. Under the information dimension approach, D is the amount of information that is needed to identify a box occupied by signal where p is the probability:

$$D = \lim_{\varepsilon \to 0} \frac{-\langle \log(p_\varepsilon) \rangle}{\log\left(\frac{1}{\varepsilon}\right)} \qquad \text{Fomula 3}$$

Figure 11:
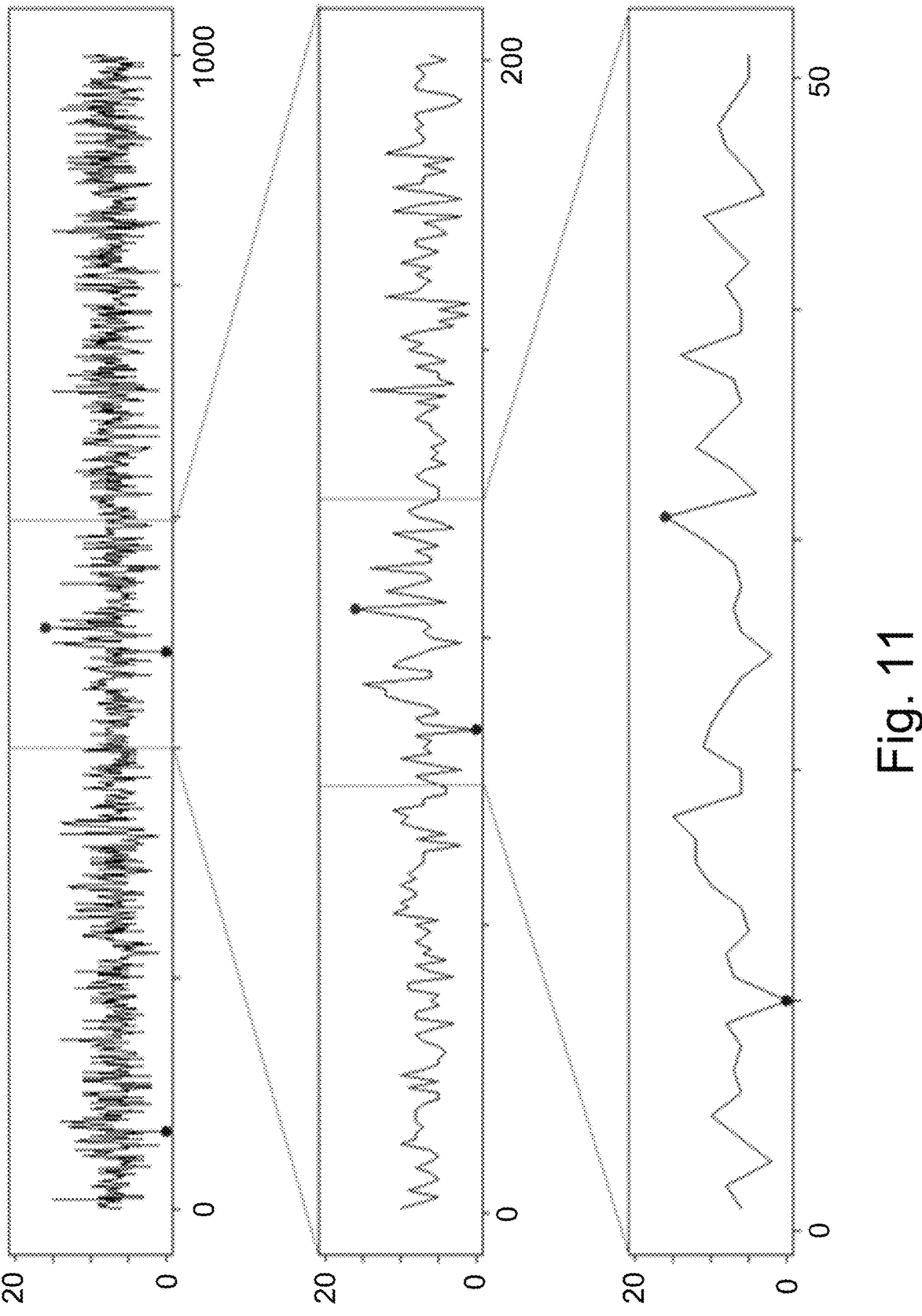
FIG. 11 is a graph of a first distribution with two successive zoomed portions.
Figure 12:
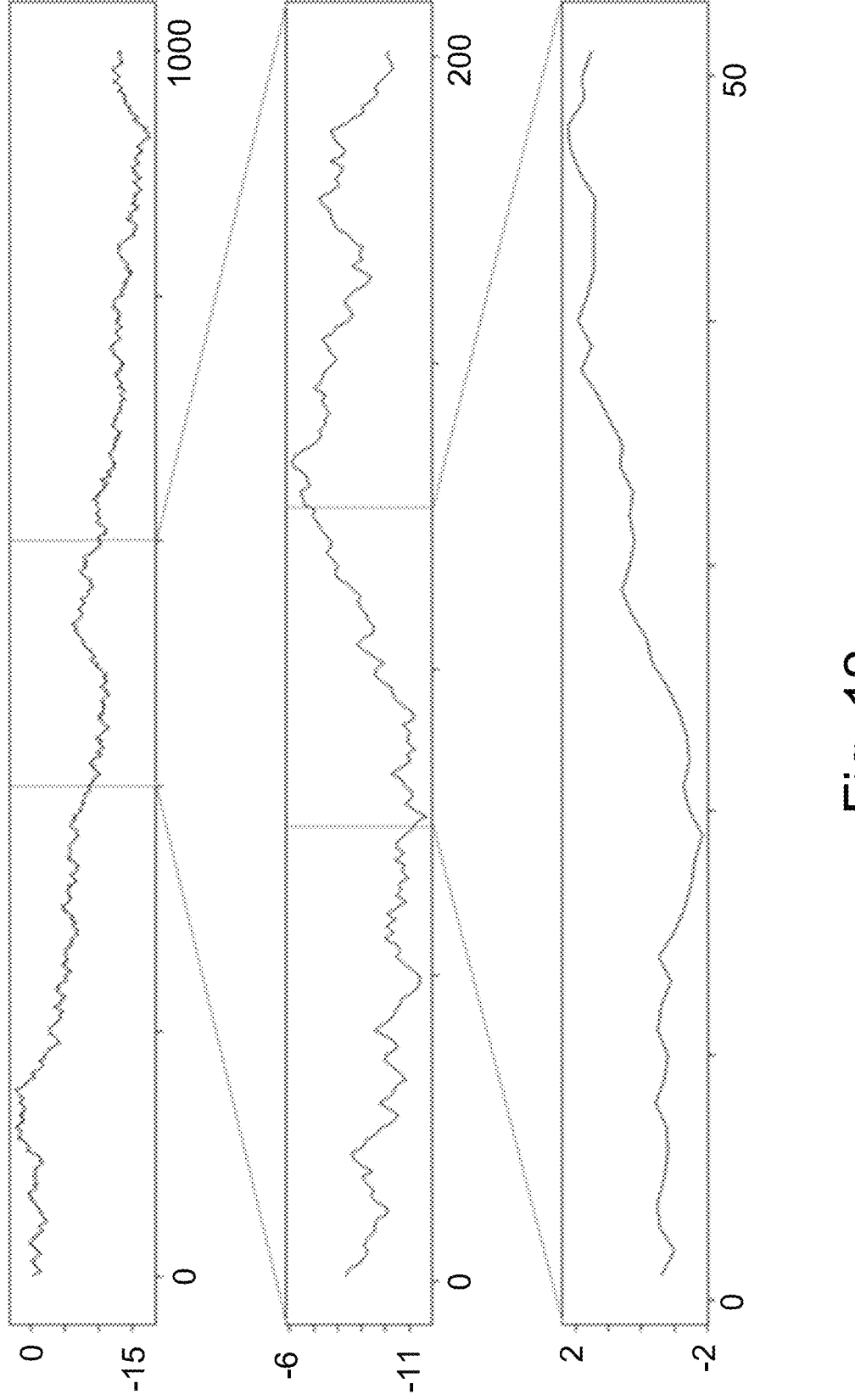
FIG. 12 is a graph of a second distribution with two successive zoomed portions.

Similar metrics can be adapted to the domain of time series 602, by mapping a non-time numerical variable to a time variable. For example, a Hurst exponent 432 H quantifies a fractal component in time-series via long-range correlation measurement. It quantifies changes in a range of numeric variables (local maximum to local minimum) versus an amount of data points. Looking at such metrics allows a system to recognize (or generate) signals that are not dependent on time. These could be relatively simple mixtures of constant signals, random (noise), but could also involve or be derived from time-independent distributions. For example, in signals generated by a Poisson distribution with parameter e per minute, an expectation per minute is e while the expectation per hour is 60e, but no additional information is gained when looking at longer periods of time. This fractal characteristic of no additional information being gained from longer durations is illustrated in FIGS. 11 and 12, as being applicable to Poisson distributions and stochastic processes (e.g., random walk) in particular. Although Poisson distributions and stochastic processes are illustrated expressly, the teachings herein also apply beneficially to other distributions 704.

Some embodiments define security alert triggers as time-series anomalies 318, by looking at a suitable variable per state profile and raising an alert in response to significant deviation from the state profile. For example, a system 102 can monitor a normal amount of extracted data per user (to spot data exfiltration), failed attempts to login per application (to spot brute-force attempts), accesses from new IP address, etc. Some embodiments define a minimal period of learning, after which actual alerts are sent, as a function of fractal dimension per profile. For profiles with a significant fractal dimension, this period 304 can be shortened considerably. For example, users extracting data as needed for their business role often display both hourly and weekly seasonality, thus the learning period can be a couple of weeks. An application 122 examining lag times may extract data with sizes coming from some uniform distribution, which can change, but is not dependent on time. The learning period for such applications can be shortened to minutes in some cases.

In order to reduce or avoid false positives, such alerts can be sent with a specific status (e.g., as a preview) or as suggestions for user consideration.

One benefit of teachings herein is a decrease in TTD for alerts raised for stable profiles, such as those usually coming from automatic processes. Diversion from the learned profile state for such applications can indicate compromised credentials or incorrect authorization, and may indicate that a threat actor or malicious insider has successfully breached the environment.

An additional benefit of teachings herein is an ability to create applications 322 that generate signals with a fractal dimension, until a scheduled or manual diversion is created. This allows a shortened time to provide security value, easily testable detection logic for customers, and functionality to readily demonstrate the capability of the service 122 for sales and marketing efforts.

Some embodiments include or utilize a logic app 322, 122 that attempts a random yet bound number of logins with wrong credentials each second. In a variation, the same app attempts a much larger number of failed attempts, thus triggering a brute force alert. This allows the IDS customer to see how the IDS works end-to-end within a few minutes after IDS installation. This function 322 can also run in a scheduled mode, thus creating an end-to-end monitor for the IDS. Advantageously, a benefit of teachings herein is that with their presence the creation of such a test application is automatable, e.g., on a per-profile basis. Since alert logic works per entity state, alerts coming from these applications 322 won't change 808 the model state of real entities, thus no false negatives will be created by use of the applications 322.

Technical Character

The technical character of embodiments described herein will be apparent to one of ordinary skill in the art, and will also be apparent in several ways to a wide range of attentive readers. Some embodiments address technical activities such as training 808 machine learning models 214, selecting 806 a machine learning model training duration 304, generating 1012 test data 404 for anomaly detection 320 tools 122, and specifying 1020 machine learning model profiles 314, which are each an activity deeply rooted in computing technology. Some of the technical mechanisms discussed include, e.g., machine learning models 214, test data generation functions 322, machine learning profiles 314, fractal dimension calculation software for various fractal metrics per FIGS. 4, and other training duration control software 302. Some of the technical effects discussed include, e.g., different respective training durations 304 for different machine learning profiles 314, shortened training durations 304, improved demonstrability of model-based security tool 122 capabilities, and greater confidence that training durations 304 and other aspects of training data 404 (e.g., spike count 712, distribution category 706) will provide sufficient model 214 training 808. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to shorten machine learning model training durations 304 without sacrificing model 214 accuracy, and how to demonstrate capabilities of a model-based security tool 122 without altering the trained state of the underlying model 214. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Machine learning duration control operations such as obtaining 802 machine learning training data 404, calculating 804 a fractal dimension of data 118, selecting 806 or revising 904 a machine learning training duration based on data fractal dimension and other data characteristics, generating 1012 test data having specific characteristics (e.g., estimated fractal dimension 306, distribution category 706, spike count 712), and many other operations discussed herein, are understood to be inherently digital. A human mind cannot interface directly with a CPU or other processor, or with RAM or other digital storage, to read and write the necessary data to perform the machine learning duration control steps 1000 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as alerting, analyzing, ascertaining, associating, calculating, categorizing, classifying, clustering, controlling, detecting, determining, disabling, employing, enabling, estimating, forecasting, generating, monitoring, noting, obtaining, performing, recognizing, revising, selecting, setting, specifying, submitting, superseding, training, transforming (and alerts, alerted, analyzes, analyzed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
101 machine in a system 102, e.g., any device having at least a processor 110 and a memory 112 and also having a distinct identifier such as an IP address or a MAC (media access control) address; may be a physical machine or be a virtual machine implemented on physical hardware
102 computer system, also referred to as a "computational system" or "computing system", and when in a network may be referred to as a "node"
104 users, e.g., user of an enhanced system 202
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102; data structures, values, mappings, software, tokens, and other examples are discussed herein 120 kernel(s), e.g., operating system(s), BIOS, UEFI, device drivers
122 tools and applications, e.g., version control systems, cybersecurity tools, software development tools, office productivity tools, social media tools, diagnostics, browsers, games, email and other communication tools, commands, and so on; services are an example of tools
124 user interface; hardware and software
126 display screens, also referred to as "displays"
128 computing hardware not otherwise associated with a reference number 106, 108, 110, 112, 114
130 resource in a system 102, e.g., data, software, hardware, or a combination thereof; a "data resource" includes data 118, and may include data that is not software, data that is also software, or data objects that represent hardware; some example resources include a virtual machine, an individual file or storage blob, a group of files, e.g., a folder or a directory subtree, and a storage account, but many other resources are also present in many systems 102
132 entity, e.g., mechanism or other source of activity in a system 102
134 authentication, type of authentication, authentication credential, or authentication mechanism in a system 102; digital or computational or both
136 cloud, also referred to as cloud environment or cloud computing environment
202 enhanced computing system, i.e., system 102 enhanced with machine learning training duration control functionality 212
204 machine learning, e.g., supervised, semi-supervised, or unsupervised learning, to configure or utilize a neural net, decision tree, support vector machine, or other artificial intelligence computational mechanism
206 training of a model 214; also referred to as teaching the model or as the model learning; computational
208 duration generally; an amount or period of time; refers to time as documented by data timestamps unless real-world (a.k.a. wall clock or calendar) time is indicated
210 control of the duration of a machine learning effort, e.g., by setting a minimum or maximum duration or both, or by analyzing or characterizing the training sufficiency of a duration, as represented by activity and data in a system 102
212 functionality for machine learning training duration control as taught herein; e.g., software or specialized hardware which performs or is configured to perform steps 804 and 806, or steps 902 and 904, or any software or hardware which performs or is configured to perform a method 1000 or a computational machine learning training duration control activity first disclosed herein
214 machine learning model, also referred to simply as a model; includes at least one neural net, decision tree, support vector machine, or other artificial intelligence computational mechanism
216 monitored system, also referred to as target system, namely, a system 102 which is monitored or protected or otherwise an activity target of a model-based tool 122; the functionality 212 is part of the target system 216 in some embodiments and is located outside the target system 216 in other embodiments
218 account in a computing system 102
302 machine learning training duration control software, e.g., software which upon execution performs at least one set of steps to provide functionality 212

304 machine learning training duration, as represented in a system 202

306 fractal dimension variable or value, as represented in a system 202, or any value computed by a fractal metric (e.g., one shown in FIG. 4) even if that value does not characterize the underlying data as fractal per se; that is, a system can calculate a fractal dimension of data which is then determined—based on the value—to not be sufficiently fractal to shorten a model training duration; by analogy, an item may have an area even if that area is zero

308 time series dataset, as represented in a system 102

310 model training data, as represented in a system 102

312 dataset duration, e.g., per timestamps in the data, as represented in a system 102

314 machine learning model profile data structure in a system 102

316 catalog (e.g., set, list, or database) of profiles 314

318 anomaly in data 118, e.g., spike

320 anomaly detection activity or anomaly detection tool 122, in a system 102

322 test data generation function in a system 202

324 interface generally in a system 102

402 fractal dimension variable or value calculated with respect to training data; as represented in a system 202

404 test data in a system 102

406 fractal dimension variable or value calculated with respect to test data; as represented in a system 202

408 estimate (or actual value) of a fractal dimension 306

410 production data in a system 102

412 fractal dimension variable or value calculated with respect to production data; as represented in a system 202

414 fractal dimension variable or value calculated by a variogram metric 434; as represented in a system 202

416 threshold in a system 102

418 tolerance in a system 102

420 fractal dimension variable or value calculated by a madogram metric 436; as represented in a system 202

422 fractal dimension variable or value calculated by an information dimension metric (also referred to as 422); as represented in a system 202

424 fractal dimension variable or value calculated by a Hausdorff dimension metric (also referred to as 424); as represented in a system 202

426 zoomed portion of a dataset 308, e.g., a contiguous subset; FIGS. 11 and 12 show illustrative examples

428 fractal dimension variable or value calculated from a zoomed portion of a dataset

430 fractal dimension variable or value calculated by a box count metric 438; as represented in a system 202

432 fractal dimension variable or value calculated by a Hurst exponent metric (also referred to as 432); as represented in a system 202

434 variogram, e.g., a function describing the degree of spatial dependence of a spatial random field or stochastic process Z(s); as represented in a system 202

436 madogram, e.g., a variation of the variogram in which a variogram squared term square-of((Z(s1)–Z(s2))) is replaced by an absolute difference absolute-value-of (Z(s1)–Z(s2)); as represented in a system 202

438 box count, e.g., a fractal dimension metric which breaks a dataset into smaller and smaller box-shaped (rectangular) pieces; as represented in a system 202

502 default training duration 304, as represented in a system 102

504 selected training duration 304, as represented in a system 202

506 dataset duration, as represented by timestamps in the dataset

508 duration of a dataset portion, as represented by timestamps in the dataset

602 time series data generally; digital

604 time series analysis computational activity

606 data clustering computational activity

608 data classification computational activity

610 data forecasting computational activity

612 trained model 214; does not necessarily exclude further training but indicates the model is deemed ready for production use or other significant employment 810, e.g., in beta testing

614 performance of a model 214, e.g., accuracy in terms of false positives or false negatives

616 confidence in sufficiency of model training, as represented by a digital value in a system 202

702 profile data structure 314 field or other variable to hold training duration value(s)

704 data distributions generally or characterizations thereof, as represented in a system 202

706 data distribution category, as represented in a system 202; a category may include one or more data distributions

708 specification of data (one or more of training, testing, production) in a profile 314 data structure

710 spike in data, as predefined or measured by a statistical or machine learning mechanism

712 count of spikes 712, e.g., for a defined dataset duration 312

800 flowchart; 800 also refers to machine learning training duration control methods that are illustrated by or consistent with the FIG. 8 flowchart

802 computationally obtain data, e.g., via a file system or an API; "computationally" means performed in a computing system, as opposed to mentally or on paper

804 computationally calculate a fractal dimension of data

806 computationally select a training duration 304 based at least in part on a fractal dimension (FD) of data, e.g., when the FD is less than a threshold TH1 use a default training duration, when the FD is between TH1 and TH2 use a training duration D1, and when the FD is between TH2 and TH3 use a training duration D2, where TH1<TH2<TH3 and D2<D1, "<" meaning less than

808 computationally train a machine learning model 214

810 computationally employ a machine learning model 214, e.g., by using the model as opposed to training the model, e.g., for anomaly detection in production data

900 flowchart; 900 also refers to machine learning training duration control methods that are illustrated by or consistent with the FIG. 9 flowchart

902 computationally calculate a fractal dimension of production data; an example of calculation step 804

904 computationally revise (change) a training duration

1000 flowchart; 1000 also refers to machine learning training duration control methods that are illustrated by or consistent with the FIG. 10 flowchart (which incorporates the FIG. 8 and FIG. 9 flowcharts)

1002 computationally transform a model into a trained model, e.g., through operation of machine learning training operations

1004 computationally submit data to a model, e.g., via an API

1006 computationally perform—by a model 214—anomaly detection or another operation

1008 computationally employ 810 a model on a per-profile basis 1010 per-profile basis, e.g., perform computational activity with a model consistent with limitations specified by a profile 314

1012 computationally generate test data, heartbeat data, or other data

1014 computationally determine a data distribution category of data, e.g., by comparison of data with a catalog of labeled distributions 704

1016 computationally recognize that two data distribution categories overlap, e.g., based on a lookup table

1018 two data distribution categories overlap (noun or verb)

1020 computationally specify data constraints for a profile 314

1022 computationally note what type 1024 of account activity is represented in data

1024 type of account activity, e.g., human-driven or service-account-driven

1026 account activity, e.g., events, log entries, traffic, etc. representing computational activity performed by (or otherwise connected to, if thus defined) an account 218

1028 computationally associate a confidence level with a training duration, e.g., based on a lookup table; in some situations a lower confidence shorter duration may be acceptable, whereas in other situations a higher confidence is preferred even if the associated duration is longer

1030 computationally supersede a default duration with a selected one

1032 computationally ascertain whether a FD is within a given tolerance

1034 computationally enable model-based tool employment

1036 computationally disable model-based tool employment

1038 computationally set a training duration; not necessarily based on any FD calculation

1040 any step or item discussed in the present disclosure that has not been assigned some other reference numeral; 1040 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments select 806 a machine learning model training duration 304 based at least in part on a fractal dimension 306 calculated 804 for a training data dataset 308. Model training durations are based on one or more characteristics of the data, such as a fractal dimension 306, a data distribution 704, or a spike count 712. Default long training durations 502 are sometimes replaced by shorter durations 504 without any loss of model accuracy. For instance, the time-to-detect for a model-based intrusion detection system 122 is shortened by days in some circumstances. Model training 808 is performed per a profile 314 which specifies particular resources 130, particular entities 132, particular types 134 of authentication, or a combination. Realistic test data 404 is generated 1012 on demand. Test data generation functions 322 allow the trained model to be exercised 810 for demonstrations, or for scheduled confirmations of effective monitoring by a model-based security tool 122, without thereby altering the model's training.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art;

innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-implemented machine learning (ML) training method with training duration control, the method performed by one or more processors of a computing system, the method comprising:

obtaining, from a storage device, a time series dataset containing training data and having a dataset duration;

calculating, by the computing system during training initialization, a training data fractal dimension that characterizes variability or self-similarity of the training data, wherein the training data fractal dimension is calculated on accumulated training data as the time series dataset is collected over the dataset duration;

selecting, by the computing system, a training duration for a ML model based at least in part on the training data fractal dimension; and training the ML model using at least a portion of the time series dataset for the selected training duration to create a trained ML model, wherein the computing system automatically ends the training in response to detecting that the training data fractal dimension satisfies a convergence threshold.

2. The method of claim 1, further comprising:

employing the trained ML model after the training by submitting production data to the trained ML model;

calculating a production data fractal dimension of the production data; and revising the training duration based at least in part on the production data fractal dimension.

3. The method of claim 1, wherein selecting the training duration for the ML model based at least in part on the training data fractal dimension comprises:

calculating a zoomed portion fractal dimension of a zoomed portion of the training data;

determining a zoomed portion distribution category of the zoomed portion;

determining a training data distribution category of the training data;

recognizing that the zoomed portion distribution category and the training data distribution category overlap; and ascertaining that the zoomed portion fractal dimension is within a predefined tolerance of the training data fractal dimension.

4. The method of claim 1, wherein the training comprises transforming the ML model into the trained ML model which performs anomaly detection on a per-profile basis for multiple profiles, each profile having a respective entity specification, or a respective resource specification, or both.

5. The method of claim 1, further comprising generating test data which is characterized in at least one of the following ways:

the generated test data has a test data fractal dimension that is within a predefined tolerance of the training data fractal dimension; or the generated test data has a test data distribution category that overlaps a training data distribution category of the training data.

6. The method of claim 1, wherein the training comprises transforming the ML model into the trained ML model which performs operations on a per-profile basis for multiple profiles, at least one profile specified by at least an authentication type.

7. The method of claim 1, wherein calculating the training data fractal dimension of the training data comprises calculating at least one of the following:

a box count fractal dimension estimate;

a Hurst exponent estimate;

an information dimension estimate;

a variogram fractal dimension estimate; or a madogram fractal dimension estimate.

8. The method of claim 1, further comprising at least one of:

noting that training data represents activity by a machine-driven account; or noting that training data represents activity by a human-driven account.

9. The method of claim 1, further comprising associating a confidence level with the training duration.

10. The method of claim 1, wherein the training duration for the ML model supersedes a default training duration, the default training duration is free of reliance on the training data fractal dimension, and the training duration is smaller than the default training duration.

11. The method of claim 1, wherein the training data fractal dimension is a Hausdorff dimension greater than one.

12. An anomaly detection computing system which utilizes machine learning, the computing system comprising: a digital memory; an anomaly detection tool having a machine learning model; and a processor in operable communication with the digital memory, the processor configured to perform machine learning operations which comprise training duration control the machine learning operations comprising:

obtaining a time series dataset containing training data and having a dataset duration;

calculating, during training initialization, a training data fractal dimension that characterizes variability or self-similarity of the training data, wherein the training data fractal dimension is calculated on accumulated training data as the time series dataset is collected over the dataset duration;

selecting a training duration for a machine learning (ML) model based at least in part on the training data fractal dimension; and training the ML model using at least a portion of the time series dataset for the selected training duration to create a trained ML model, wherein the computing system automatically ends the training in response to detecting that the training data fractal dimension satisfies a convergence threshold; and employing the anomaly detection tool after the training by submitting production data to the trained machine learning model.

13. The computing system of claim 12, wherein the anomaly detection tool is configured to perform anomaly detection on a per-profile basis, the computing system further comprises a catalog of profiles configuring the digital memory, and each profile comprises:

a training duration slot; and at least one of: an entity specification, or a resource specification.

14. The computing system of claim 13, wherein at least one profile further comprises at least one of:

a minimum spike count for the training data; or a training data distribution category.

15. The computing system of claim 12, further comprising a test data generation function which upon execution by the processor generates anomaly detection tool test data which is characterized in at least one of the following ways:

the generated test data has a test data fractal dimension that is within a predefined tolerance of the training data fractal dimension; or the generated test data has a test data distribution category that overlaps a training data distribution category of the training data.

16. A computer-readable storage device configured with data and instructions which upon execution by a processor cause a computing system to perform a machine learning training method with training duration control, the method performed by a computing system in a cloud computing environment, the method comprising:

obtaining, from a storage device, a time series dataset containing training data and having a dataset duration;

calculating, by the computing system during training initialization, a training data fractal dimension that characterizes variability or self-similarity of the training data, wherein the training data fractal dimension is calculated on accumulated training data as the time series dataset is collected over the dataset duration;

selecting, by the computing system, a training duration for a ML model based at least in part on the training data fractal dimension; and training the ML model using at least a portion of the time series dataset for the selected training duration to create a trained ML model, wherein the computing system automatically ends the training in response to detecting that the training data fractal dimension satisfies a convergence threshold.

17. The computer-readable storage device of claim 16, wherein the training comprises transforming the ML model into the trained ML model which performs at least one of the following: anomaly detection, time series analysis, clustering, classification, or forecasting.

18. The computer-readable storage device of claim 16, further comprising the trained ML model performing anomaly detection on a per-profile basis.

19. The computer-readable storage device of claim 16, further comprising generating test data having a test data fractal dimension that is within a predefined tolerance of the training data fractal dimension.

20. The computer-readable storage device of claim 16, wherein the training data fractal dimension is a Hausdorff dimension greater than one, and the training data is non-periodic and not randomly distributed.

* * * * *